(12) United States Patent
Young et al.

(10) Patent No.: US 7,701,471 B1
(45) Date of Patent: Apr. 20, 2010

(54) METHODS AND APPARATUS TO DISPLAY A VIEWING REGION

(75) Inventors: Jeffrey E. Young, San Jose, CA (US); Stefan Cameron, Ottawa (CA); Mark C. Leyden, Oxford Mills (CA)

(73) Assignee: Adobe Systems Incorporated, San Jose, CA (US)

( * ) Notice: Subject to any disclaimer, the term of this patent is extended or adjusted under 35 U.S.C. 154(b) by 219 days.

(21) Appl. No.: 11/070,651

(22) Filed: Mar. 2, 2005

(51) Int. Cl.
*G09G 5/00* (2006.01)
*G06F 3/048* (2006.01)

(52) U.S. Cl. ............ 345/629; 345/684; 345/157; 715/784; 715/785; 715/786; 715/787; 715/788; 715/763; 715/801; 707/102; 382/113

(58) Field of Classification Search ......... 715/784–788; 345/157, 629, 684; 707/102
See application file for complete search history.

(56) References Cited

U.S. PATENT DOCUMENTS

| | | | | |
|---|---|---|---|---|
| 4,831,556 A | * | 5/1989 | Oono | 715/786 |
| 5,550,969 A | * | 8/1996 | Torres et al. | 715/787 |
| 5,883,970 A | * | 3/1999 | Kikuchi | 382/113 |
| 5,896,132 A | * | 4/1999 | Berstis et al. | 715/786 |
| 5,904,727 A | * | 5/1999 | Prabhakaran | 701/208 |
| 5,952,995 A | * | 9/1999 | Barnes | 345/157 |
| 6,057,840 A | * | 5/2000 | Durrani et al. | 715/786 |
| 6,069,626 A | * | 5/2000 | Cline et al. | 715/786 |
| 6,118,449 A | * | 9/2000 | Rosen et al. | 715/861 |
| 6,252,594 B1 | * | 6/2001 | Xia et al. | 715/786 |
| 6,337,694 B1 | * | 1/2002 | Becker et al. | 345/684 |
| 6,448,986 B1 | * | 9/2002 | Smith | 715/801 |
| 6,476,831 B1 | * | 11/2002 | Wirth et al. | 715/784 |
| 6,803,930 B1 | * | 10/2004 | Simonson | 715/784 |
| 7,076,738 B2 | * | 7/2006 | Baker et al. | 715/763 |
| 7,149,982 B1 | * | 12/2006 | Duperrouzel et al. | 715/788 |
| 2004/0135819 A1 | * | 7/2004 | Maa | 345/840 |
| 2004/0167919 A1 | * | 8/2004 | Sterling et al. | 707/102 |
| 2006/0048073 A1 | * | 3/2006 | Jarrett et al. | 715/784 |
| 2006/0061597 A1 | * | 3/2006 | Hui | 345/629 |

* cited by examiner

*Primary Examiner*—Jin-Cheng Wang
(74) *Attorney, Agent, or Firm*—Chapin IP Law, LLC; Barry W. Chapin, Esq.

(57) ABSTRACT

An application initiates a display of a first portion of an image in a viewing region of a display screen. Additionally, the application initiates a transparent display of an overflow indicator in a display area of the viewing region to enable viewing through the overflow indicator to corresponding content associated with the image. As its name suggests, the overflow indicator indicates that there is a second portion of the image not currently displayed in the viewing region. This technique of providing the overflow indicator overlaid on the image enhances a user's viewing experience because a display area or region occupied by the overflow indicator (e.g., a shaded region) enables a user to i) view an unobstructed view of the image beneath the overflow indicator, and ii) identify that a current size of the viewing region only shows a portion of the image rather than the whole image.

40 Claims, 11 Drawing Sheets

METHODS AND APPARATUS TO DISPLAY A VIEWING REGION

BACKGROUND

Use of windows has become quite common in conventional computer applications. One reason for such a broad acceptance of windows is the convenience afforded by their use. For example, via use of a window-based application such as a text editor, a computer user can open a "window" and view and modify the contents of a file such as a text document displayed in the window. Typically, windows include data input display regions such as icons, data fields, scroll bars, pull-down menus, etc. for a computer user to provide control commands associated with the window.

One purpose of providing a conventional scroll bar in a window is to enable the computer user to traverse different sections of a document that otherwise cannot be efficiently displayed in the window at the same time. For example, in many circumstances, a window can display only a portion of a document for viewing by the computer user. Based on input to the scroll bar, the computer user can easily control which sections of the document to display in the window for viewing.

One way of controlling which portion of an image is displayed in a window is to click on a reference icon (e.g., a movable mark in the scrollbar representing a relative position of an image currently viewed in the window) and drag the reference icon up and down the scrollbar. In response to sliding the reference icon in the scrollbar, different respective sections of the image appear in the window for viewing by the computer user.

SUMMARY

Conventional techniques such as the use of conventional scrollbars enabling a user to select which portion of an overall image are displayed in a window for viewing suffer from a number of deficiencies. For example, conventional techniques of providing a scrollbar function in a display window to "move about" the image reduces the size of a display region of the window that can be used to display the image. That is, as is typically the case, scrollbars appearing along respective right and bottom sides of the window occupy a display area that could otherwise be used to display a further portion of an image. However, in many circumstances, the benefit of providing scroll bars in a window outweighs a cost of reducing a usable display area of the respective window for displaying a larger portion of an image.

Unfortunately, according to conventional applications, certain dimensions (e.g., thickness) of scrollbars do not resize themselves when a user reduces a respective size of a window. In other words, a width of the scrollbar often stays the same size even though a user reduces a size of the respective window displaying an image. In an extreme case, when a user minimizes a size of a window to be as small as possible, a respective scrollbar of the window can occupy a larger display area than a display region for displaying a portion of the image.

Even if a size of a scrollbar was proportionally reduced as a user resizes a respective window to be smaller, eventually such scrollbars would become so small that they would be cumbersome to use. Consequently, developers of window applications requiring a display of very small sized windows (which is sometimes required because there are so many windows or palettes that need to be simultaneously displayed on a display screen) typically need to address an issue of a reduced display region for displaying a portion of a respective image. Otherwise, to view contents of an image in a small window, the user has to manually open or expand the size of the window, potentially select an object, and close the window again to its original size so that the window is not needlessly obstructing a view of another window on a display screen.

Techniques discussed herein deviate with respect to conventional applications such as those discussed above as well as additional techniques also known in the prior art. In particular, embodiments herein include mechanisms and techniques to more efficiently utilize a viewing region (e.g., a window) to display a partial image to a computer user. For example, a technique as further described herein involves displaying a transparent indicator (e.g., a transparent shaded region) in a viewing region of a display screen to indicate a display function such that only a portion of an overall image is displayed in the viewing region.

More particularly, according to one configuration, an application (e.g., a windows-based application) displays a first portion of an image in a viewing region of a display screen. Additionally, the application transparently displays an overflow indicator in a display area of the viewing region to enable viewing through the overflow indicator to corresponding content associated with the image in the display area. As its name suggests, the overflow indicator indicates that there is a second portion of the image not currently displayed in the viewing region. This technique of providing the overflow indicator overlaid on the image increases an effectiveness of the viewing region because a display area occupied by the overflow indicator (e.g., a shaded overlay) enables a user to i) view an unobstructed view of the image in the display beneath the overflow indicator, and ii) identify that a current size of the viewing region only shows a portion of the image rather than the whole image. As discussed above, conventional window display functions such as scrollbars completely obstruct viewing of a portion of an image occupied by the scrollbar.

According to one embodiment, the application displays the overflow indicator along a respective side or perimeter of the viewing region. Displaying the overflow indicator on a side of the viewing region enables a user to identify a direction of possible expansion of the viewing region. A display application monitors for input provided by a user. In response to receiving a selection of the overflow indicator by the user viewing the display screen, the application displays at least part of a second portion of the image previously not displayed in the viewing region.

According to one configuration, in response to selection (e.g., a user clicking on the overflow indicator) of the overflow indicator, the application herein initiates execution of an expand function to enlarge a size of the viewing region to enable more of the image to be concurrently displayed on the display screen. According to another configuration, the application herein initiates execution of a scrolling function to enable scrolling of the image within the viewing region in response to receiving selection of the overflow indicator. Selection of a partially transparent display area of the viewing region may cause the application to initiate other types of functionality as well.

Further functionality of the application discussed herein includes generating the image displayed in a viewing region to include display elements enabling a user to provide input with respect to an application generating the viewing region. For example, the application can generate an image in the viewing region including selectable icons, data fields, pull-down menus, etc. for a user to perform a corresponding function with respect to the viewing region. Thus, when the application herein displays the overflow indicator as a partially transparent shaded region, a user can view a larger portion of the image in the viewing region than if a display area occupied by the overflow indicator is otherwise not "see-through."

Other embodiments herein include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

As discussed above, techniques herein are well suited for use in computer systems that display windows for displaying content, images, etc. However, it should be noted that embodiments of the present application are not limited to use in such applications and that the techniques discussed herein are well suited for other applications as well. Additional features of the present application will be further discussed via the Detailed Description section of this application as well as accompanying figures.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one implementation herein, an application (e.g., a windows-based software application) displays a transparent overflow indicator (e.g., a transparent shaded region) in a viewing region such as a window of a display screen. The overflow indicator indicates a display condition in which only a portion of an overall image is displayed in the viewing region of the display screen. This technique of providing the overflow indicator as a shaded region overlaid on the image increases an effectiveness of the viewing region because a display area occupied by the overflow indicator (e.g., a shaded overlay) enables a user to simultaneously i) view an unobstructed view of the image in the display beneath the overflow indicator, and ii) identify that a current size of the viewing region only shows a portion of the image rather than the whole image. As discussed above, conventional window display functions such as scrollbars completely obstruct viewing of a portion of an image occupied by the scrollbar, thus, reducing an overall display area available for viewing the image.

Figure 1:
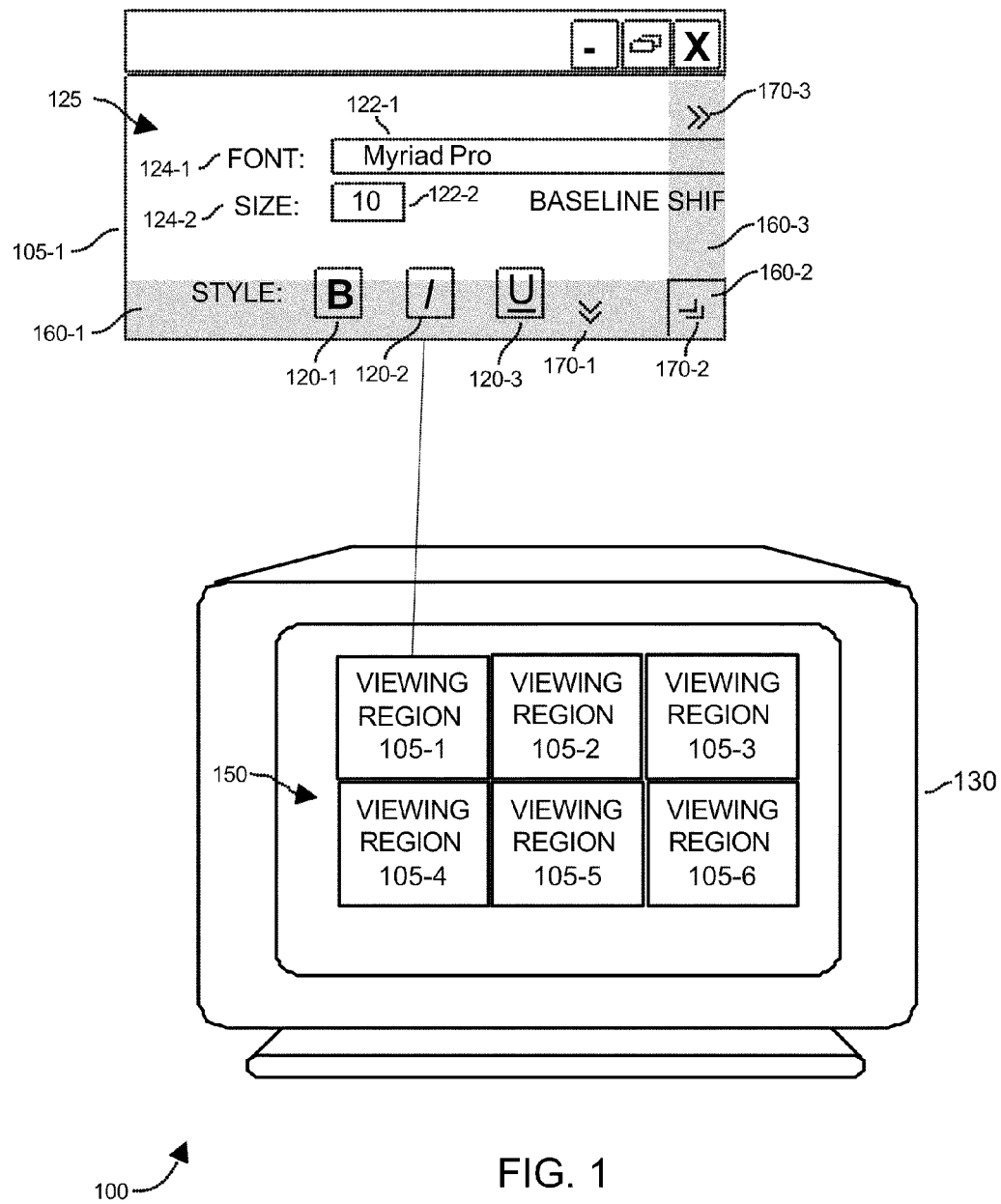
FIG. 1 is a diagram of a display environment for displaying a graphical user interface.

FIG. 1 is a diagram of an example display environment 100 according to an embodiment herein. As shown, display environment 100 includes display screen 130 displaying graphical user interface 150. Graphical user interface 150 includes respective viewing region 105-1, 105-2, . . . , 105-6, (collectively, viewing regions 105). Viewing region 105-1 displays partial image 125 including content such as selectable display element 120-1 (e.g., an icon to bold text), selectable display element 120-2 (e.g., an icon to italicize text), selectable display element 120-3 (e.g., an icon to underline text), (collectively, selectable display elements 120), non-selectable display element 124-1 (e.g., background text of partial image 125), non-selectable display element 124-2 (collectively, non-selectable display viewing regions 105), input data field 122-1, and input data field 122-2. Viewing region 105-1 includes overflow indicator 160-1, overflow indicator 160-2, and overflow indicator 160-3 (collectively, overflow indicators 160). Each of the overflow indicators 160 includes a respective arrow 170. For example, overflow indicator 160-1 includes respective arrow 170-1 to identify a direction in which partial image 125 overflows or is cut off because viewing region 105-1 cannot simultaneously display all contents of an overall or whole image associated with partial image 125. Overflow indicator 160-2 includes respective arrow 170-2, overflow indicator 170-3 includes respective arrow 170-3. Such overflow arrows 170-2 and 170-3 each serve a similar function as overflow indicator 170-1. That is, arrows 170 indicate a direction in which partial image 125 has been cut off due to a small size of the viewing region 105-1.

Display screen 130 displays partial image 125 in viewing region 105-1. Display screen 130 also transparently displays overflow indicators 160 in a display area of the viewing region 105-1 in such a way as to enable viewing through the overflow indicators 160 to corresponding content associated with the partial image 125. For example, a user viewing display screen 130 can "see through" shaded overflow indicator 160-1 to view selectable display elements 120 associated with partial image 125. In a similar way, a user can view content associated with partial image 125 through overflow indicator 160-3.

Note that selectable display elements 120, input data fields 122, pull-down menus, etc. associated with partial image 125 enable a user to provide input to an application generating graphical user interface 150.

As their names suggest, the overflow indicators 160 indicate that there are further portions of the partial image 125 not currently displayed in the viewing region 105-1. As discussed, this technique of providing the overflow indicators 160 overlaid on the partial image 125 of viewing region 105-1 increases an effectiveness of the viewing region 105-1 because a display area occupied by the overflow indicator (e.g., a shaded region) enables a user to i) view unobstructed views of the partial image 125 in the viewing region 105-1 beneath the overflow indicators 160, and ii) identify that a current size of the viewing region 105-1 only shows a portion of an overall image rather than the whole image. Thus, in contradistinction to conventional methods, the overflow indicators 160 do not reduce an effective size of usable area in a viewing region 105-1 to display a portion of the partial image 125.

As mentioned, according to one configuration, display screen 130 displays the overflow indicators 160 as partially transparent shaded regions of a selected visual type such as a unique color, pattern, etc. to indicate that a whole image associated with partial image 125 is not currently displayed in the viewing region. Overflow indicators 160 can be displayed via other types of "see through" patterns as well such as cross-hatched patterns, lines, arrows, completely transparent display regions (e.g., an overflow indicator 160 can be invisible but still selectable), etc.

As shown, display screen 130 can display the overflow indicators 160 along respective sides such as a perimeter location of the viewing region 105-1. Displaying the overflow indicators 105-1 on sides of the viewing region 105-1 enables a user to identify a direction of possible expansion of the viewing region 105-1. For example, overflow indicator 160-1 indicates that viewing region 105-1 can be expanded to downward to view further contiguous portions associated with partial image 125. Overflow indicator 160-3 indicates that viewing region 105-1 can be expanded to the right to view further contiguous portions (e.g., non-displayed portions) associated with partial image 125.

In addition to and as a possible alternative to displaying overflow indicator 160 at a perimeter location of viewing region 105-1 to indicate a direction of possible expansion or scrolling, respective overflow indicators 160 can include arrows 170 to indicate such directionality. Consequently, an overflow indicator 160 can be located at anywhere in the viewing region 105-1 instead of at a perimeter location.

According to one configuration, in a display area occupied by the overflow indicator 160-2, viewing region 105-1 includes arrow 170-2 at an angle with respect to a horizontal axis and a vertical axis of the display screen 130. Based on the angle, the arrow 170-2 indicates multiple directions of possible expansion of the viewing region 105-1 to view a larger portion of an overall image associated with partial image 125. In the sample shown, a user can select overflow indicator 160-2 to expand or scroll to the right and downward at the same time. Also, according to one configuration, a display application can expand in all directions when a user selects any of overflow indicator 160.

A display application generating graphical user interface 150 monitors for input (e.g., movement and selection by a mouse) provided by a user. In response to receiving a selection of the overflow indicators 160 by the user viewing the display screen 130, the display application displays at least part of a second portion associated with the partial image 125 previously not displayed in the viewing region 105-1. According to one configuration, display screen 130 highlights an overflow indicator 160 to more dominantly appear in the viewing region 105-1 over the partial image 125 when a user moves a controllable pointer over a respective overflow indicator 160 of viewing region 105-1.

In response to selection (e.g., a user clicking on the overflow indicator or user merely steering a mouse pointer over the overflow indicator 160 without clicking) of the overflow indicator 160, a display application herein can initiate execution of an expand function to enlarge a size of the viewing region 105-1 to enable more of the partial image 125 to be concurrently displayed on the display screen 130. Alternatively, a display application herein can initiate execution of a scrolling function to enable scrolling with respect to the partial image 125 within the viewing region 125 in response to receiving selection of the overflow indicator 160.

Selection of a partially transparent display area (e.g., the overflow indicator 160) of the viewing region 105-1 may cause the display application generating graphical user interface 150 to initiate execution of other types of functionality as well. For example, according to other configurations, a user can click on an overflow indicator to close a viewing region 105, change a view mode, modify contents of partial image 125, open another window, etc.

According to one configuration, a degree of shading (i.e., transparency) associated with the overflow indicator 170 can vary depending on a relative size of a balance of partial image 125 not currently displayed in the viewing region 105. In other words, for larger portions of an image not displayed in viewing region 105, the overflow indicator may be less transparent to a viewer. A size (e.g., width, coverage area, etc.) of the viewing region 170 may also provide an indication of how much of an overall image associated with partial image 125 is not currently shown in viewing region 105.

According to a configuration as discussed, a display application generating graphical user interface 150 enables a user to select an overflow indicator 160 in the viewing region 105-1 to initiate execution of a function associated with the viewing region 105-1. In certain conditions, a user may wish to at least temporarily disable a function associated with the overflow indicator 160. For example, as shown in FIG. 1, a user may wish to initiate execution of a "bolding" function by clicking on selectable display element 120-1 rather than perform, e.g., an expand function associated with viewing region 105-1 by shading in an overflow indicator 160. In such an instance, a display application detects that the user at least temporarily disables a function associated with the overflow indicator 160. In response to receiving selection of selectable display element 120-1 of the partial image 125 transparently viewable through a display area of the overflow indicator 160-1, the display application initiates execution of a display function associated with the selectable display element 120-1 in lieu of initiating execution of a display function associated with the overflow indicator 160-1. Thus, even though a user effectively clicks on the overflow indicator 160-1, the display application initiates execution of the bolding function.

According to one configuration, without at least temporarily disabling the overflow indicators 160, execution of a display function associated with a selected overflow indicator 160 takes precedence over a selectable display element 120 beneath it.

In an alternative configuration, a display application automatically initiates execution of a function associated with selectable display element 120 when a user clicks on a selectable display element 120 through the overflow indicator 160-1. For instance, in such a case, a display application generating graphical user interface 150 receives a selection by a user while a user-controlled pointer element displayed in the viewing region 105-1 is simultaneously over i) a display area occupied by the overflow indicator 160-1 in the viewing region 105-1 and ii) a selectable display element 120 associated with the partial image 125. In response to receiving such a selection, the display application initiates execution of a display function associated with the selectable display element 120 in the partial image 125 in lieu of initiating execution of a display function associated with the overflow indicator 160.

In contrast, when a display application generating graphical user interface 150 receives a selection by a user while a user-controlled pointer element displayed in the viewing region 105-1 is over a display area occupied by the overflow indicator 160 in the viewing region 105-1 but the pointer is not over a selectable display element 120 or other user input region associated with the partial image 125, the display application initiates execution of a display function associated with the overflow indicator 160.

Figure 2:
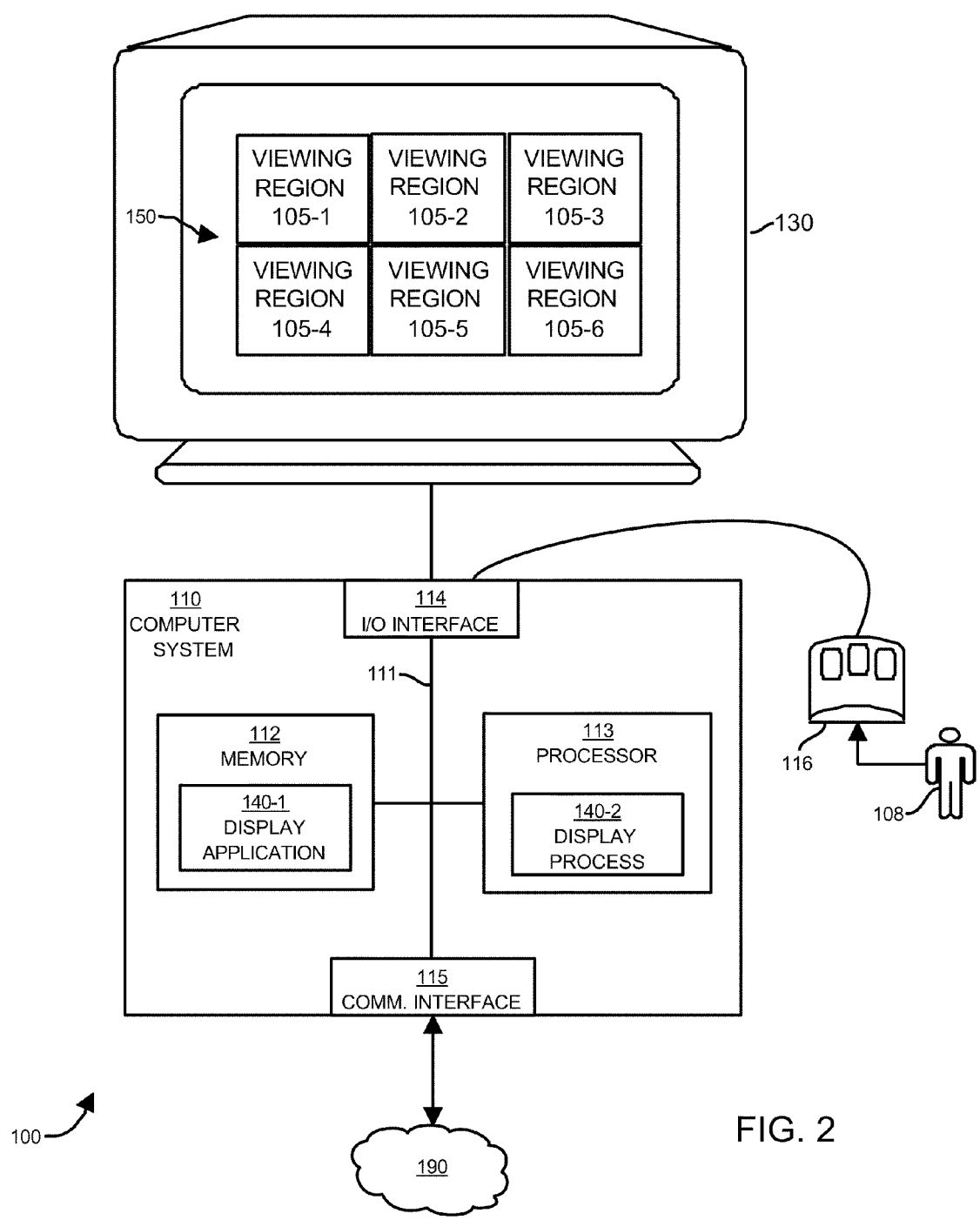
FIG. 2 is a diagram of a processing device suitable for executing a display process to generate a graphical user interface.

FIG. 2 is a block diagram illustrating example architecture of a computer system 110 that executes, runs, interprets, operates or otherwise performs a display application 140-1 and display process 140-2 suitable for use in explaining example configurations herein. As shown, graphical user interface 150 on display screen 130 includes respective viewing regions 105. Computer system 110 may be any type of computerized device such as a personal computer, workstation, portable computing device, console, laptop, network terminal or the like.

As further shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, etc.) couples to processor 113 through I/O interface 114 and enables a user 108 to provide input commands and generally control the graphical user interface 150 that display application 140-1 and process 140-2 provides on display 130. Also in this example configuration, a repository (e.g., a computer readable medium such as disk, disk storage system, etc.) stores files that are accessed by processes of computer system 110. The communications interface 115 enables the computer system 110 to communicate with other devices (i.e., other computers) on a network 190 and display images (e.g., based on retrieved files) on display screen 130.

Memory system 112 is any type of computer readable medium and in this example is encoded with a display application 140-1 supporting generation, display, and implementation of functional operations of the graphical user interface 150 as explained herein. The display application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the display application 140-1. Execution of the display application 140-1 in this manner produces processing functionality in a display process 140-2. In other words, the display process 140-2 represents one or more portions or runtime instances of the display application 140-1 (or the entire application) performing or executing within or upon the processor 113 in the computerized device 110 at runtime.

It should be noted that example configurations disclosed herein include the display application 140-1 itself (i.e., in the form of un-executed or non-performing logic instructions and/or data, executable on a computer system 110) that is stored on a tangible computer readable storage medium (such as a floppy disk, hard disk, electronic, magnetic, optical or other tangible computer readable storage medium). The display application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the display application 140-1 in the processor 113 as the display process 140-2. Those skilled in the art will understand that the computer system 110 may include other processes and/or software and hardware components or systems not shown in this example.

It also should be noted that the display application 140 executed in computer system 110 can be represented in FIG. 2 by either one or both of the display application 140-1 and/or the display process 140-2. For purposes of the discussion hereinafter, general reference will be made to the display application 140 as performing or supporting the various steps and functional operations to carry out techniques discussed herein.

Figure 3:
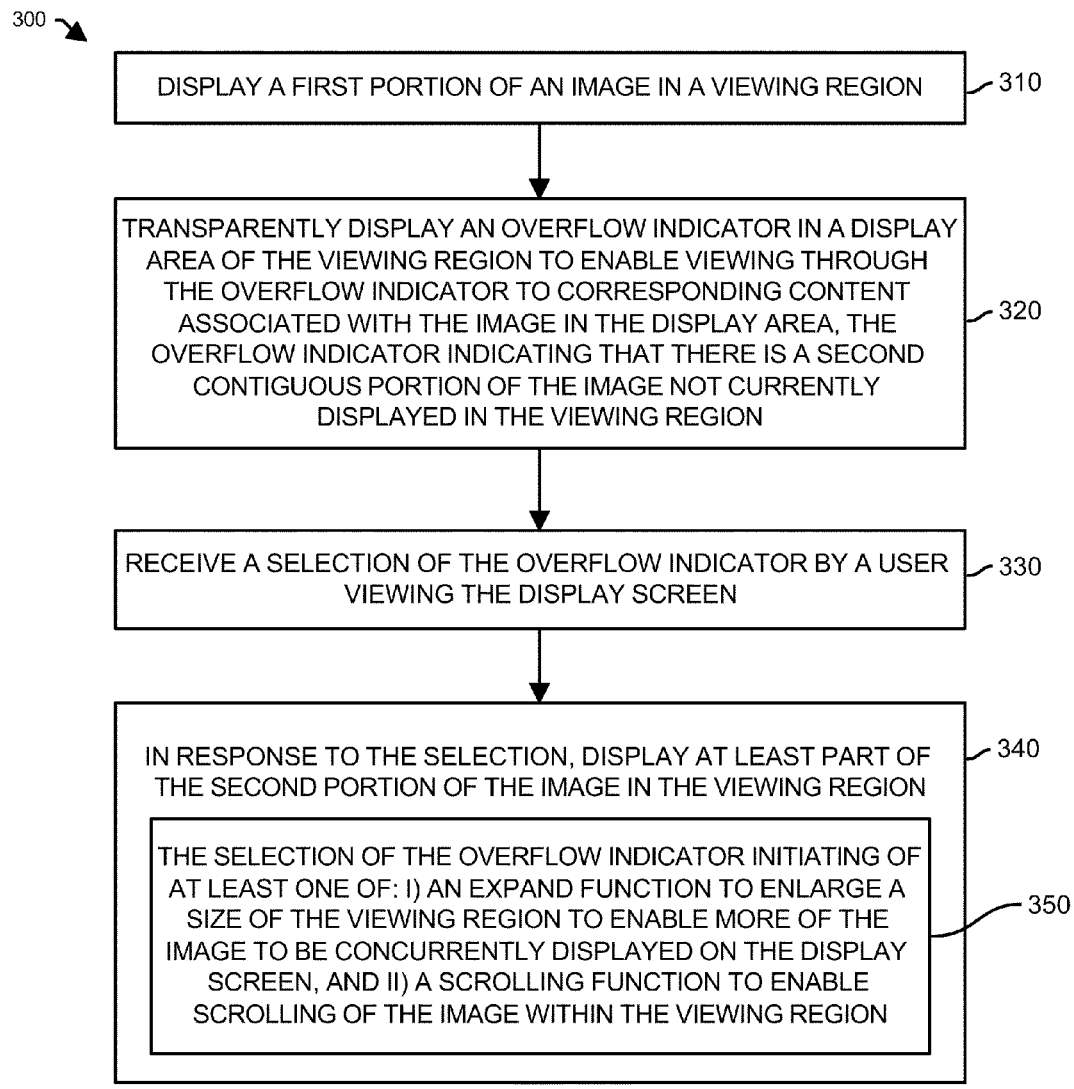
FIG. 3 is a flowchart illustrating a technique of displaying overflow indicators in viewing regions of a graphical user interface.

FIG. 3 is a flowchart 300 illustrating techniques of displaying images in respective viewing regions 105 of display screen 130 according to an embodiment herein. These techniques were previously discussed with respect to FIGS. 1 and 2 and are now shown in flowchart form below.

In step 310, display application 140 initiates display of a first portion of an image in a viewing region 105-1.

In step 320, display application 140 initiates a transparent display of an overflow indicator 160-1 in a display area of the viewing region 105-1 to enable viewing through the overflow indicator 160-1 to corresponding content (e.g., selectable display elements 120) associated with the image in the display area, the overflow indicator 160-1 indicating that there is a second contiguous portion of the image not currently displayed in the viewing region 105-1.

In step 330, display application 140 receives a selection of the overflow indicator 160-1 by a user 108 viewing the display screen 130.

In step 340, in response to the selection, display application 140 displays at least part of the second portion of the image in the viewing region 105-1.

In sub-step 350, based on the selection of the overflow indicator 160-1, display application 140 initiates at least one of: i) an expand function to enlarge a size of the viewing region 105-1 to enable more of the image to be concurrently displayed on the display screen 130, and ii) a scrolling function to enable scrolling of the image within the viewing region 105-1.

Figure 4:
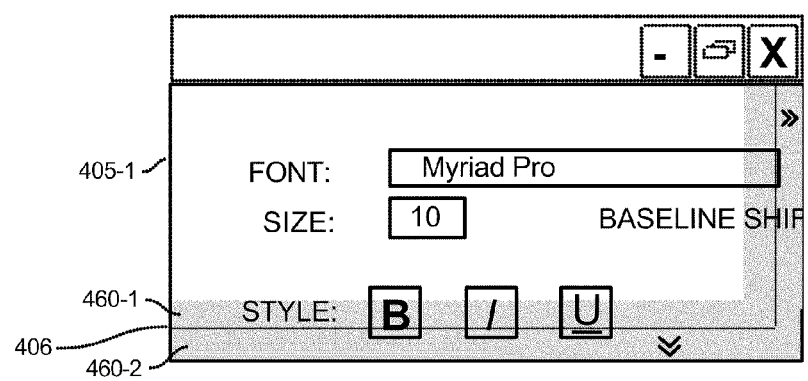
FIG. 4 is a diagram of a viewing region for displaying multiple overflow indicators.

FIG. 4 is a diagram illustrating use of multiple partially transparent display regions. As shown, viewing region 405-1 includes overflow indicator 460-1 and overflow indicator 460-2. Line 406 identifies a demarcation (e.g., dividing line) between the overflow indicators 460 and need not be included in an actual display implementation of viewing region 405-1 and overflow indicators 460.

According to one configuration, display application 140 displays overflow indicator 460-1 as a first visual type of region (e.g., colored, patterned, etc.) display region and overflow indicator 460-2 as a second visual type of region (e.g., colored, patterned, etc.). Each of the display regions can be selected by user 108 to perform different functions. For example, display application 140 displays a region associated with the overflow indicator 460-2 to enable a user 108 to enlarge a size of the viewing region 405-1 to view a larger portion of an overall image associated with partial image 125. Display application 140 displays overflow indicator 460-1 to enable scrolling of an overall image associated with partial image 125 within the viewing region 405-1.

FIGS. 5-11 are screenshots of graphical user interface 150 illustrating use of overflow indicators according to example embodiments herein.

Figure 5:
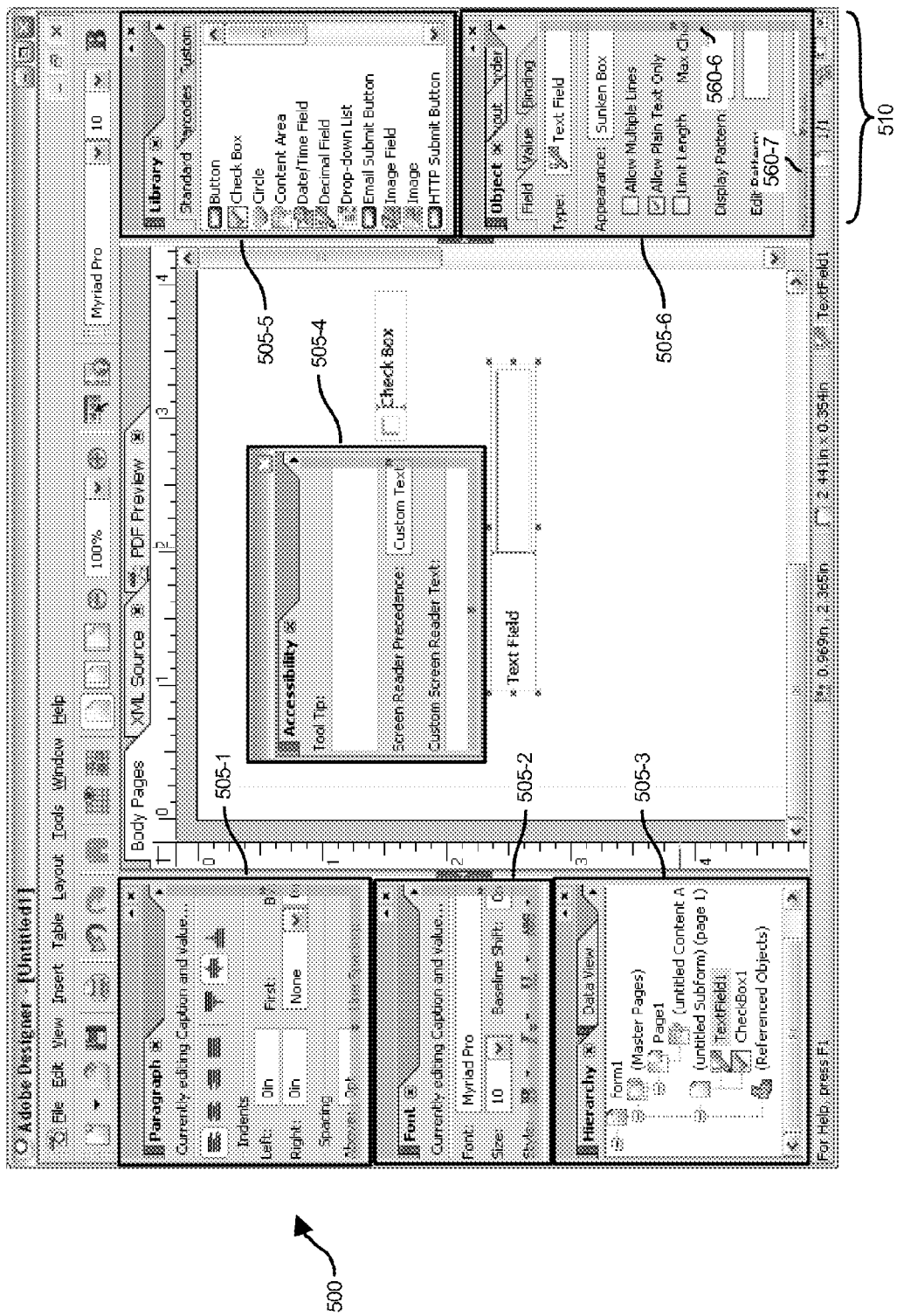
FIGS. 5-11 are screenshots of a graphical user interface according to embodiments herein.

More particularly, FIG. 5 is a screenshot 500 illustrating a graphical user interface 150 according to an embodiment herein. As shown, screenshot 500 includes multiple windows 505 (namely, window 505-1, window 505-2, window 505-3, window 505-4, window 505-5, and window 505-6). Window 505-6 includes overflow indicator 560-6 and overflow indicator 560-7. Display application 140 aligns window 505-5 and window 505-6 along column region 510 for presentation purposes. In response to selecting (e.g., clicking) on overflow indicator 560-6, display application 140 produces screenshot 600 in FIG. 6.

Figure 6:
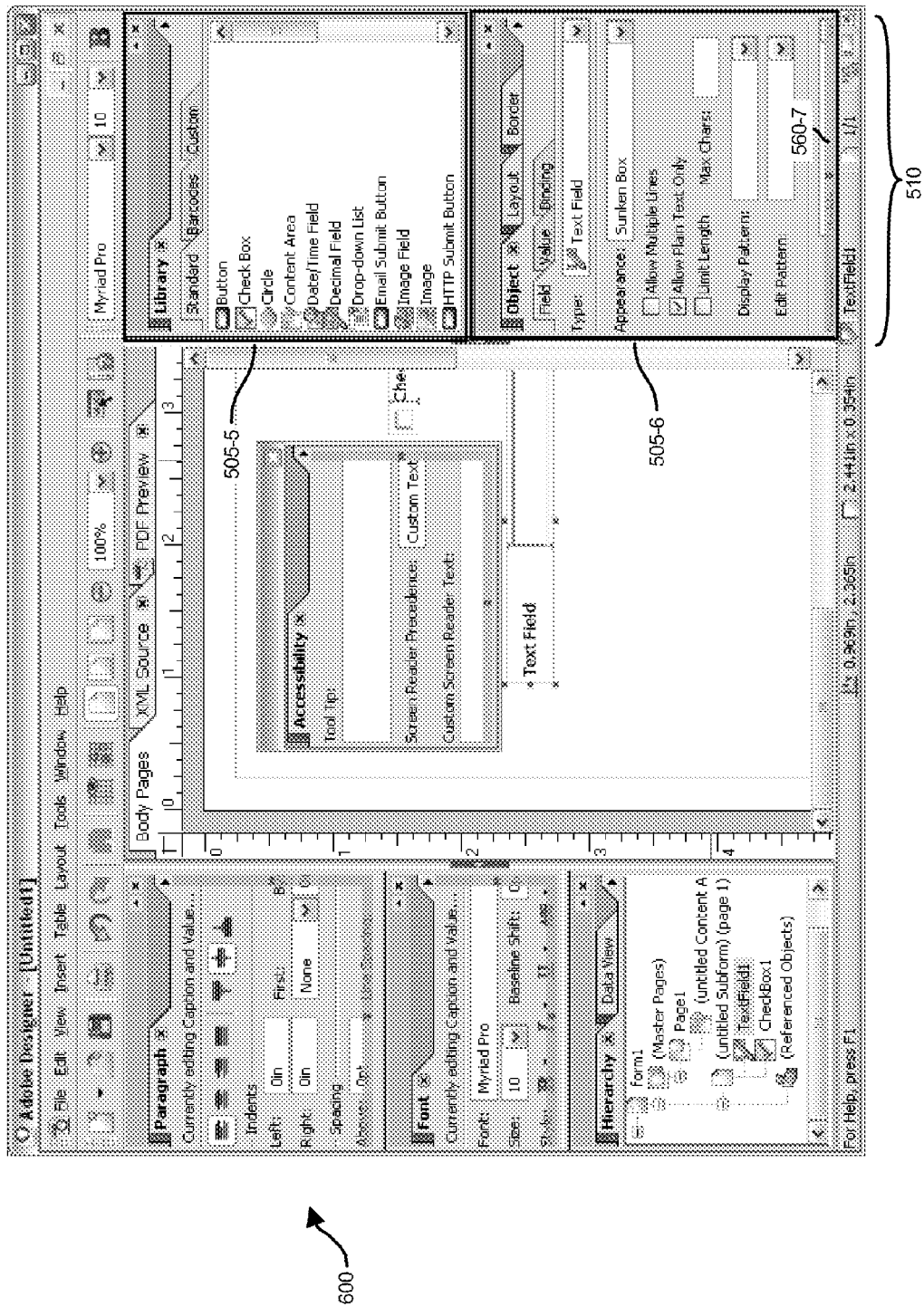

FIG. 6 is a screenshot 600 of graphical user interface 150 according to an embodiment herein. As shown, screenshot 600 includes multiple windows 505 including window 505-5 and window 505-6. Note that as a result of user 108 selecting overflow indicator 560-6 in FIG. 5, display application 140 enlarges column region 510 and expands a view of window 505-6. Overflow indicator 560-6 disappears following resizing of the window 505-6. Window 505-6 still includes overflow indicator 560-7 indicating a direction of further possible expansion. In response to user 108 selecting (e.g., clicking) on overflow indicator 560-7, display application 140 produces screenshot 700 in FIG. 7.

Figure 7:
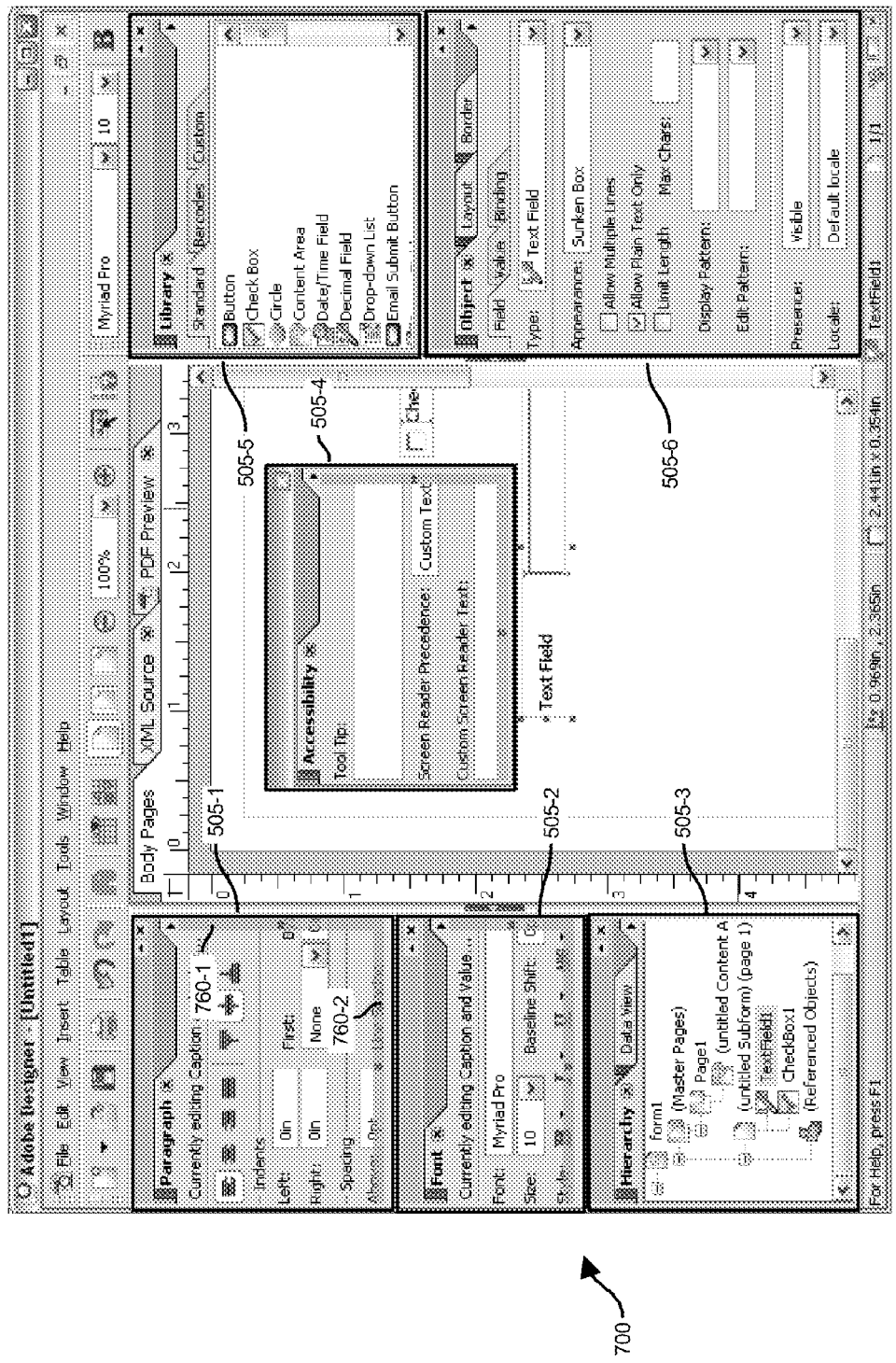

FIG. 7 is a screenshot 700 of graphical user interface 150 according to an embodiment herein. As shown, screenshot 700 includes multiple windows 505 including window 505-1, window 505-2, window 505-3, window 505-5, and window 505-6. Note that as a result of user 108 selecting overflow indicator 560-7 in FIG. 6, display application 140 expands window 505-6 to its full size. Thus, overflow indicator 560-7 (in FIG. 6) disappears following resizing of the window 505-6. Display application 140 aligns window 505-1, window 505-2, and window 505-3 in column region 710. Window 505-1 includes overflow indicator 760-1 and overflow indicator 760-2. In response to user 108 selecting (e.g., clicking on) overflow indicator 760-1 and overflow indicator 760-2, display application 140 produces screenshot 800 in FIG. 8.

Figure 8:
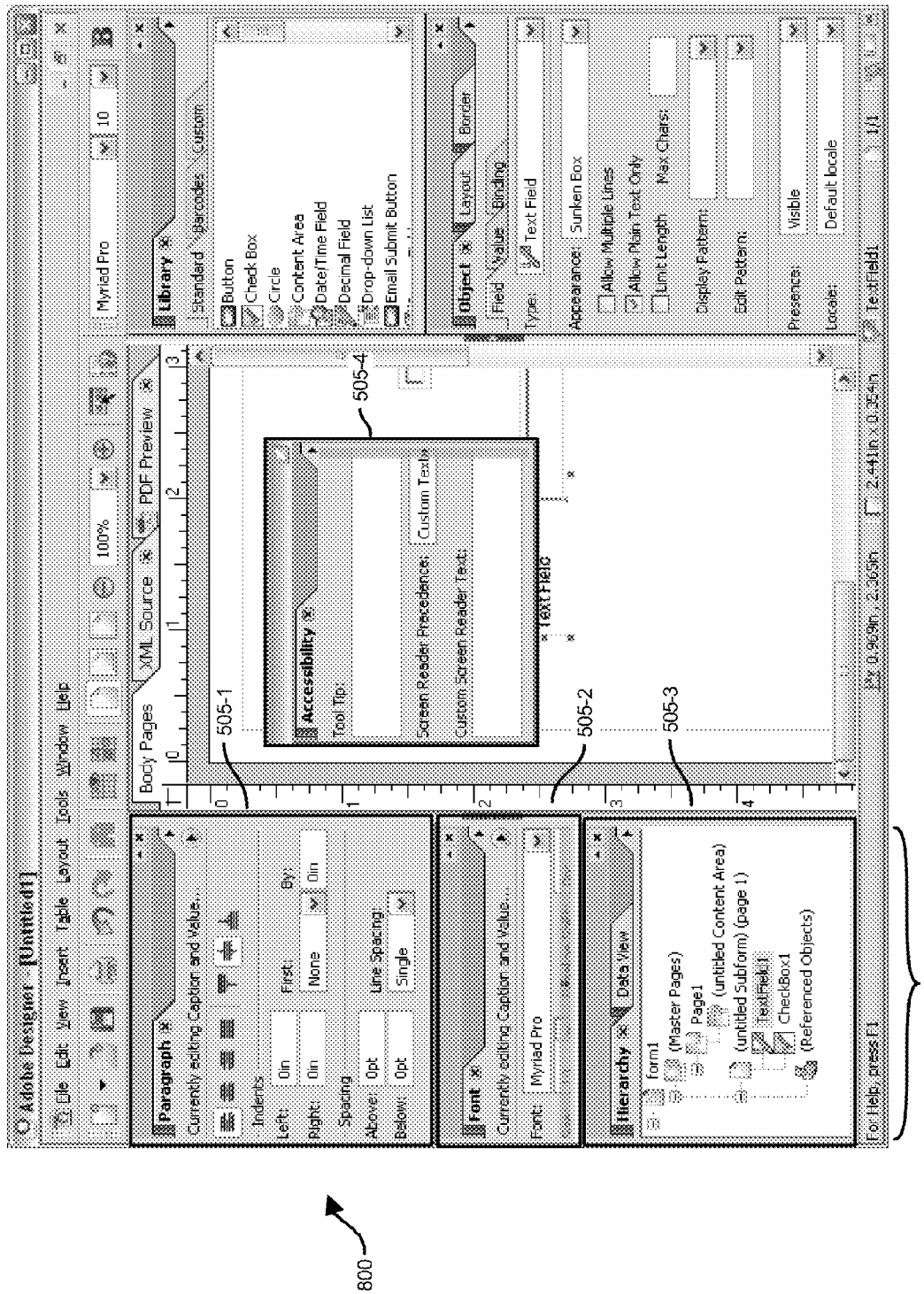

FIG. 8 is a screenshot 800 of graphical user interface 150 according to an embodiment herein. As shown, screenshot 800 includes multiple windows 505 including window 505-1, window 505-2, window 505-3, and window 505-4. Note that as a result of user 108 selecting overflow indicators 760-1 and 760-2 in FIG. 7, display application 140 expands window 505-1 to its full size by enlarging column region 710. Accordingly, one embodiment herein includes displaying the window 505-1 of multiple windows 505 displayed on the display screen. The display application 140 aligns window 505-1, 505-2, and 505-3 in column region 710. In response to receiving a selection of the overflow indicator 760-1 in window 505-1 based on input from a user 108 to expand the first window to view a larger portion of the image therein, the display application 140 resizes the column region 710 as well as corresponding widths of windows 505-1, 505-2, and 505-3. Overflow indicators 760-1 and 760-2 as shown in FIG. 7 disappear following resizing of the window 505-1. In response to user 108 selecting (e.g., dragging) a bottom frame of window 505-4 upwards, display application 140 produces screenshot 900 in FIG. 9.

Figure 9:
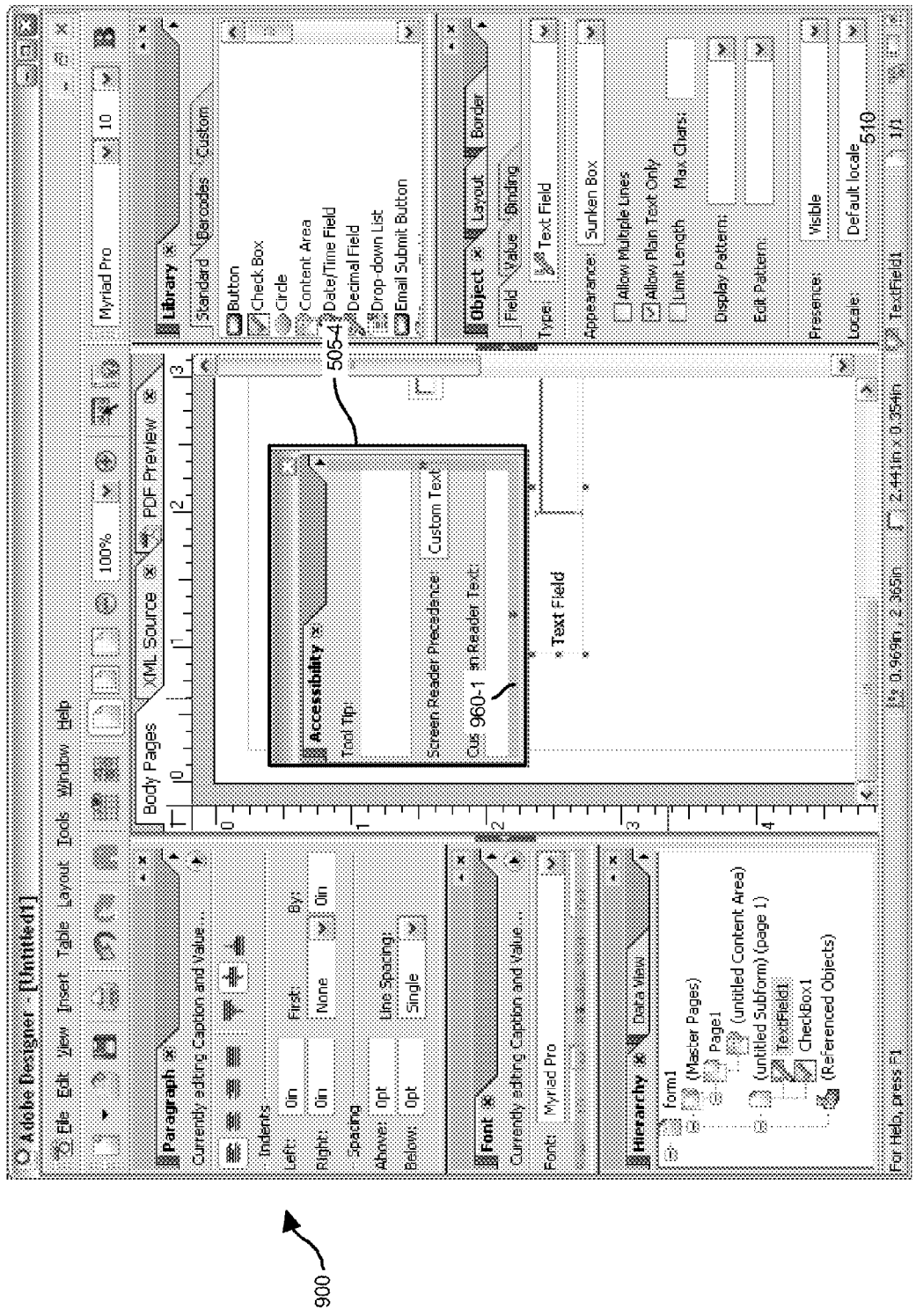

FIG. 9 is a screenshot 900 of graphical user interface 150 according to an embodiment herein. As shown, screenshot 900 includes multiple windows 505 including window 505-4 (e.g., a floating window). Note that as a result of user 108 making window 505-4 smaller in FIG. 8, display application 140 provides an overflow indicator 960-1 to indicate that an image in window 505-4 is only a partial image and that window 505-4 can be expanded. In response to user 108 selecting and dragging window 505-4 to the bottom right hand section of screenshot 900 as well as maximizing a size of window 505-4, display application 140 produces screenshot 1000 in FIG. 10.

Figure 10:
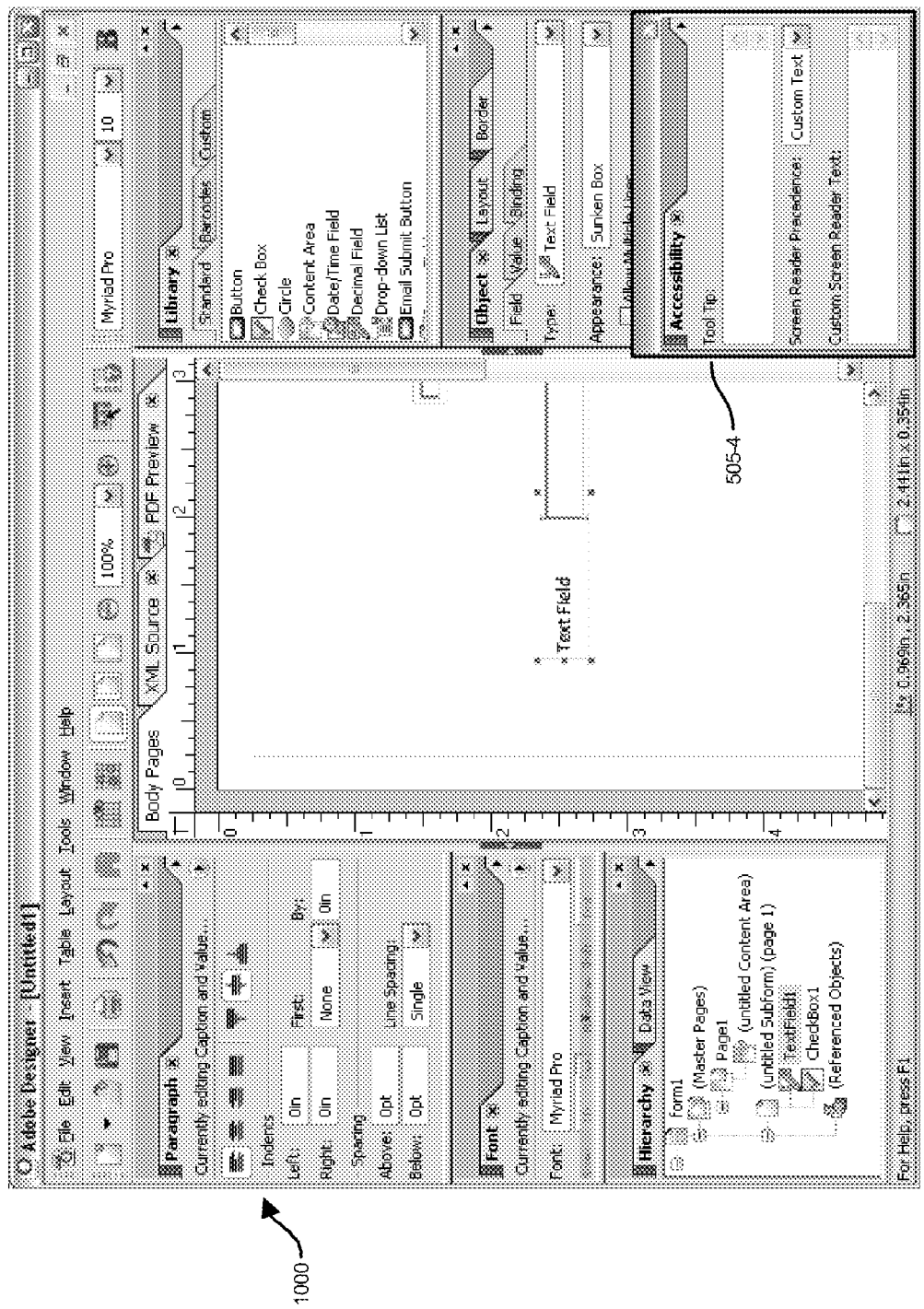

FIG. 10 is a screenshot 1000 of graphical user interface 150 according to an embodiment herein. As shown, screenshot 1000 includes multiple windows 505 including window 505-4. Note that as a result of user 108 moving window 505-4 in FIG. 8, display application 140 displays window 505-4 in a bottom right portion of screenshot 1000. In response to user 108 selecting and dragging window 505-4 to overhang past the bottom right hand section of screenshot 1000, display application 140 produces screenshot 1100 in FIG. 11.

Figure 11:
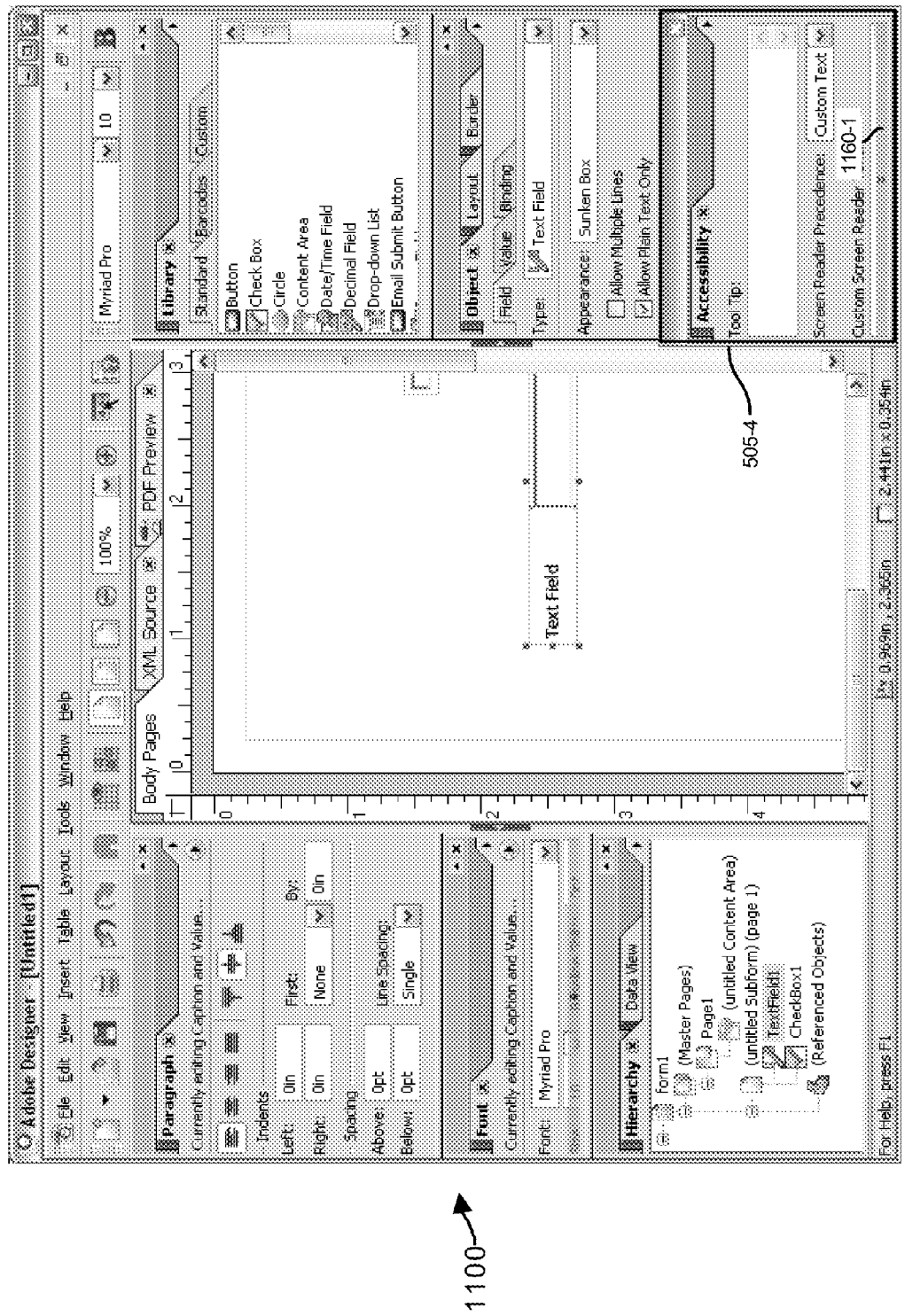

FIG. 11 is a screenshot 1100 of graphical user interface 150 according to an embodiment herein. As shown, screenshot 1100 includes multiple windows 505 including window 505-4. Note that as a result of user 108 moving window 505-4 in FIG. 8, display application 140 displays window 505-4 to include overflow indicator 1160-1 to indicate that an image in window 505-4 is only a partial image.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which a computer system executes instructions retrieved from memory, the computer-implemented method comprising:

displaying a first portion of an image in a viewing region of a display screen;

displaying an overflow indicator in the viewing region to indicate that there is a second portion of the image not currently displayed in the viewing region;

displaying the overflow indicator to be at least partially transparent for viewing of at least a portion of the image through the overflow indicator;

displaying the first portion of the image to include at least one selectable display element, the at least one selectable display element being transparently viewable through the overflow indicator;

responsive to receiving a selection of a region of the overflow indicator in which there is no selectable display element transparently viewable through the region of the overflow indicator, initiating execution of a display function associated with the overflow indicator by said computer system;

responsive to receiving, through the overflow indicator, a selection of the selectable display element by a user-controlled pointer element simultaneously over the overflow indicator in the viewing region and the selectable display element, initiating execution of a display function associated with the selectable display element in lieu of initiating execution of the display function associated with the overflow indicator by said computer system;

wherein initiating execution of the display function associated with the overflow indicator includes: initiating an expand function to create an enlarged viewing region to enable more of the image to be concurrently displayed on the display screen, resulting in the first portion of the image and the at least part of the second portion of the image being concurrently displayed in the enlarged viewing region;

wherein initiating execution of a display function associated with the selectable display element includes: initiating an editing function for editing the image in the viewing region;

displaying the viewing region as a substantially rectangular window in which the image is displayed; and wherein initiating the expand function to create an enlarged viewing region includes: enlarging a first rectangular viewing region having a first two-dimensional area into a second rectangular viewing region having a second two-dimensional area, wherein the second two-dimensional area is larger in size then the first two-dimensional area.

2. The computer-implemented method as in claim 1, wherein the selection of the overflow indicator further results in initiation of a scrolling function to enable scrolling of the image within the viewing region.

3. The computer-implemented method as in claim 1 further comprising:

displaying the overflow indicator as a partially transparent shaded region along a portion of a perimeter of the viewing region to indicate a direction of possible expansion of the viewing region, a degree of shading associated with the overflow indicator varying depending on a relative size of the second portion of the image not currently displayed in the viewing region; and providing an arrow in the partially transparent shaded region to identify a direction of possible expansion of the viewing region to view a larger portion of the image.

4. The computer-implemented method as in claim 1 further comprising:

in a region occupied by the overflow indicator, providing an arrow at an angle with respect to a horizontal axis and a vertical axis of the display screen, the arrow indicating multiple directions of possible expansion of the viewing region to view a larger portion of the image.

5. The computer-implemented method as in claim 1, wherein displaying the first region includes displaying the first region of the overflow indicator as a first visual type;

wherein displaying the second region of the overflow indicator includes displaying the second region of the overflow indicator as a second visual type;

and wherein displaying the overflow indicator includes displaying the overflow indicator at a perimeter location of the viewing region.

6. The computer-implemented method as in claim 1 further comprising:

highlighting the overflow indicator to more dominantly appear in the viewing region in response to movement of a pointer over the overflow indicator.

7. The computer-implemented method as in claim 1 further comprising:

displaying the viewing region as a floating window on the display screen;

receiving selection of the overflow indicator on a particular side of the viewing region indicating a direction to view an expanded view of the image; and in response to the selection, expanding a size of the viewing region in the direction associated with the particular side of the overflow indicator.

8. The computer-implemented method as in claim 1 further comprising:

displaying the viewing region as a first window of multiple windows displayed on the display screen, at least the first window and a second window of the multiple windows being aligned and disposed in a column region of the display screen;

receiving a selection of the overflow indicator in the first window to expand the first window to view a larger portion of the image; and in response to the selection, expanding the column region as well as a width of both the first window and the second window in the column region.

9. The computer-implemented method as in claim 1, wherein displaying the first portion of the image includes:

generating the first portion of the image in the viewing region to include display elements to provide input with respect to an application generating the viewing region; and displaying the overflow indicator as a transparent shaded region over multiple display elements associated with the image.

10. The method as in claim 1, wherein displaying the overflow indicator includes:

displaying a first region of the overflow indicator that, when selected, initiates an expand function to enlarge a size of the rectangular viewing region for more of the image to be concurrently displayed on the display screen; and displaying a second region of the overflow indicator that, when selected, initiates scrolling of the image within the rectangular viewing region to display at least part of the second portion of the image without concurrently displaying the first portion of the image.

11. The method as in claim 10 further comprising:

responsive to receiving, through the second region of the overflow indicator, a selection of the selectable display element, initiating execution of the display function associated with the selectable display element in lieu of initiating scrolling of the image, wherein initiating execution of the display function includes executing a text editing operation on a file displayed in a separate viewing region.

12. The method as in claim 1, further comprising:

removing the overflow indicator from display upon initiating an expand function to create the enlarged viewing region.

13. The method as in claim 1, further comprising:

displaying the viewing region as a window adjacent to at least one additional window in a column region of the display screen; and responsive to receiving a selection of the overflow indicator, resizing the additional window to a width of the enlarged viewing region.

14. The method of claim 1, wherein displaying the image includes displaying a layout of control elements for editing content within a file, the file displayed in a second viewing region that is separate from the viewing region displaying the image.

15. The computer-implemented method of claim 1 further comprising:

displaying the overflow indicator as a transparent shaded region through which the image can be viewed, the transparent shaded region being distinct from the image.

16. The computer-implemented method as in claim 15 further comprising:
    displaying a first part of the transparent shaded region substantially along an entire length of a bottom perimeter of the viewing region, selection of the first part of the transparent shaded region enabling expansion of the viewing region in a downward direction with respect to the viewing region; and
    displaying a second part of the transparent shaded region substantially along on an entire length of a side perimeter of the viewing region, the first part of the transparent shaded region along the side perimeter being orthogonal with respect to the first part of the transparent shaded region along the bottom perimeter, selection of the second part of the transparent shaded region enabling expansion of the viewing region in a side direction with respect to the viewing region.

17. The computer-implemented method as in claim 16 further comprising:
    displaying an arrow in the first part of the shaded transparent region to indicate a downward direction in which the viewing region can be expanded upon selection of the first part of the shaded transparent region;
    displaying an arrow in the second part of the shaded transparent region to indicate a side direction in which the viewing region can be expanded upon selection of the second part of the shaded transparent region, the arrow in the first part of the shaded transparent region pointing in an orthogonal direction with respect to the arrow in the second part of the shaded transparent region; and
    displaying an arrow at an intersection of the first part of the shaded region and the second part of the shaded region, the arrow at the intersection being diagonal with respect to both the arrow in the first part of the shaded transparent region and the arrow in the second part of the shaded transparent region, the arrow at the intersection indicating that the viewing region can be simultaneously expanded both in the downward direction and the side direction upon selection of the intersection.

18. The computer-implemented method as in claim 17 further comprising:
    in response to receiving selection of the first part of the shaded transparent region:
        initiating enlargement of the viewing region in a direction as specified by the arrow in the first part of the shaded transparent region;
        preventing display of the first part of the shaded transparent region at the bottom of the enlarged viewing region; and
        initiating display of the second part of the shaded region substantially along an entire length of a side perimeter of the enlarged viewing region.

19. The computer-implemented method as in claim 17 further comprising:
    in response to receiving selection of the second part of the shaded transparent region, initiating enlargement of the viewing region in a direction opposite that of the direction of the arrow in the second part of the shaded transparent region.

20. The computer-implemented method of claim 15 further comprising:
    in response to receiving the selection of a region of the transparent shaded region in which there is no selectable display element transparently viewable through the region of the overflow indicator, closing the viewing region.

21. The computer-implemented method of claim 15 further comprising:
    in response to receiving the selection of a region of the transparent shaded region in which there is no selectable display element transparently viewable through the region of the overflow indicator, modifying contents of the first portion of the image in the viewing region.

22. The computer-implemented method of claim 15, wherein a degree of shading associated with the overflow indicator varies depending on a relative size of a balance of the image not currently displayed in the viewing region, the overflow indicator being displayed as a less transparent region as the balance of the image not currently displayed in the viewing region is larger compared to the first portion of the image displayed in the viewing region.

23. The computer-implemented method as in claim 1 further comprising:
    displaying the overflow indicator to include a first selectable shaded region and a second selectable shaded region, the portion of the image being viewable through both the first selectable shaded region and the second selectable shaded region, the first selectable shaded region being of a visually different shade type than the second selectable region;
    wherein the first selectable shaded region, when selected, enables scrolling of the image in the viewing region; and
    wherein the second selectable shaded region, when selected, enables enlargement of a size of the viewing region on the display screen to display a larger portion of the image.

24. The computer-implemented method of claim 1 wherein displaying the first portion of the image to include at least one selectable display element includes displaying the at least one selectable display element, the display element controlling modification of attributes associated with a file that is rendered in a second viewing region separate from the viewing region displaying the first portion of the image;
    wherein initiating execution of the display function associated with the overflow indicator includes initiating an expand function to create an enlarged viewing region to enable more of the image to be concurrently displayed on the display screen, the initiating the expand function resulting in the first portion of the image and the at least part of the second portion of the image being concurrently displayed in the enlarged viewing region; and
    wherein initiating execution of the display function associated with the selectable display element includes initiating an editing function that modifies attributes of the file rendered in the second viewing region.

25. The computer-implemented method of method 24 further comprising:
    displaying multiple rectangular viewing regions on the display screen, each viewing region containing display elements that are controls for editing attributes of a file that is rendered in a file viewing region, the file viewing region being separately displayed from the multiple viewing regions containing display elements, each viewing region containing overflow indicators;
    wherein displaying the first portion of the image in the viewing region of the display screen includes displaying the viewing region as a frame having a perimeter of a first length, the viewing region being an entity separate from the image displayed within the viewing region; and wherein initiating execution of the display function associated with the overflow indicator results in the perimeter of the enlarged viewing region having a second length that is greater than the first length of the perimeter.

26. The computer-implemented method of claim 1, wherein displaying the first portion of the image in the viewing region of the display screen includes displaying the viewing region as a frame having a perimeter of a first length, the viewing region being an entity separate from the image displayed within the viewing region;
   wherein initiating execution of the display function associated with the overflow indicator includes initiating an expand function to create an enlarged viewing region to enable more of the image to be concurrently displayed on the display screen, the perimeter of the enlarged viewing region having a second length that is greater than the first length of the perimeter.

27. The computer-implemented method of claim 1, further comprising:
   displaying multiple rectangular viewing regions on the display screen, each viewing region containing display elements that are controls for editing attributes of a file that is rendered in a file viewing region, the file viewing region being separately displayed from the multiple viewing regions containing display elements, each viewing region containing overflow indicators;
   wherein initiating execution of the display function associated with each overflow indicator includes initiating an expand function to create an enlarged viewing region to enable more of the image to be concurrently displayed on the display screen, the initiating the expand function resulting in the first portion of the image and the at least part of the second portion of the image being concurrently displayed in the enlarged viewing region; and
   wherein initiating execution of the display function associated with the selectable display element includes initiating an editing function that modifies attributes of the file rendered in the file viewing region.

28. The computer-implemented method of claim 1, wherein selection of any region of the overflow indicator in which there is no selectable display element transparently viewable though the overflow indicator results in execution of the display function associated with the overflow indicator.

29. The computer-implemented method of claim 28, wherein execution of the display function associated with the overflow indicator results in expansion of the viewing region on the display screen for simultaneous display of the first portion of the image and the second portion of the image in the enlarged viewing region.

30. The computer-implemented method of claim 29, wherein execution of the display function associated with the overflow indicator enlarges the viewing region, the first portion of the image displayed in the enlarged viewing region being a same size as the first portion of the image displayed in the viewing region before execution of the display function associated with the overflow indicator.

31. The computer-implemented method of claim 30, wherein the display function associated with the selectable display element is a text editor function.

32. The method as in claim 28, wherein displaying the overflow indicator includes:
   displaying a first region of the overflow indicator that, when selected, initiates an expand function to enlarge a size of the viewing region for simultaneous display of the first portion of the image and second portion of the image on the display screen; and
   displaying a second region of the overflow indicator that, when selected, initiates scrolling of the image within the viewing region to display at least part of the second portion of the image.

33. The computer-implemented method of claim 29 further comprising:
   displaying the viewing region to receive text editing commands to modify text.

34. A computer program product including a tangible computer-readable storage medium having computer-executable instructions stored thereon for processing data information, such that the computer-executable instructions, when carried out by a processing device, enable the processing device to perform the operations of:
   displaying a first portion of an image in a viewing region of a display screen;
   displaying an overflow indicator in the viewing region to indicate that there is a second portion of the image not currently displayed in the viewing region;
   displaying the overflow indicator to be at least partially transparent for viewing of at least a portion of the image through the overflow indicator;
   displaying the first portion of the image to include at least one selectable display element, the at least one selectable display element being transparently viewable through the overflow indicator;
   responsive to receiving a selection of a region of the overflow indicator in which there is no selectable display element transparently viewable through the region of the overflow indicator, initiating execution of a display function associated with the overflow indicator by said processing device;
   responsive to receiving, through the overflow indicator, a selection of the selectable display element by a user-controlled pointer element simultaneously over the overflow indicator in the viewing region and the selectable display element, initiating execution of a display function associated with the selectable display element in lieu of initiating execution of the display function associated with the overflow indicator by said processing device;
   wherein initiating execution of the display function associated with the overflow indicator includes: initiating an expand function to create an enlarged viewing region to enable more of the image to be concurrently displayed on the display screen, resulting in the first portion of the image and the at least part of the second portion of the image being concurrently displayed in the enlarged viewing region;
   wherein initiating execution of a display function associated with the selectable display element includes: initiating an editing function for editing the image in the viewing region;
   displaying the viewing region as a substantially rectangular window in which the image is displayed; and
   wherein initiating the expand function to create an enlarged viewing region includes: enlarging a first rectangular viewing region having a first two-dimensional area into a second rectangular viewing region having a second two-dimensional area, wherein the second two-dimensional area is larger in size then the first two-dimensional area.

35. The computer program product as in claim 34, wherein the selection of the overflow indicator further results in initiation of a scrolling function to enable scrolling of the image within the viewing region.

36. The computer program product as in claim 34, wherein transparently displaying the overflow indicator includes:
  displaying a partially transparent shaded region of a selected visual type to indicate that the second portion of the image is not currently displayed in the viewing region.

37. The computer program product as in claim 34, wherein displaying the first region includes displaying the first region of the overflow indicator a first visual type;
  wherein displaying the second region of the overflow indicator includes displaying the second region of the overflow indicator a second visual type;
  and wherein displaying the overflow indicator includes displaying the overflow indicator at a perimeter location of the viewing region.

38. The computer program product as in claim 34 further supporting operations of:
  displaying the viewing region as a first window of multiple windows displayed on the display screen, at least the first window and a second window of the multiple windows being aligned and disposed in a column region of the display screen;
  receiving a selection of the overflow indicator in the first window based on input to expand the first window to view a larger portion of the image; and
  in response to the input, expanding the column region as well as a width of both the first window and the second window in the column region.

39. The computer program product as in claim 34, wherein displaying the first portion of the image includes:
  generating the first portion of the image in the viewing region to include display elements to provide input with respect to an application generating the viewing region; and
  displaying the overflow indicator as a transparent shaded region over multiple display elements associated with the image.

40. A computer system comprising:
  a memory;
  a processor;
  a display;
  a communications interface;
  an interconnection mechanism coupling the memory, the processor, the display, and the communications interface, allowing communication there between;
  wherein the memory is encoded with a display application, that when executed in the processor, provides a display process to display, by causing the computer system to perform operations of:
    displaying a first portion of an image in a viewing region of a display screen;
    displaying an overflow indicator in the viewing region to indicate that there is a second portion of the image not currently displayed in the viewing region;
    displaying the overflow indicator to be at least partially transparent for viewing of at least a portion of the image through the overflow indicator;
    displaying the first portion of the image to include at least one selectable display element, the at least one selectable display element being transparently viewable through the overflow indicator;
    responsive to receiving a selection of a region of the overflow indicator in which there is no selectable display element transparently viewable through the region of the overflow indicator, initiating execution of a display function associated with the overflow indicator;
    responsive to receiving, through the overflow indicator, a selection of the selectable display element by a user-controlled pointer element simultaneously over the overflow indicator in the viewing region and the selectable display element, initiating execution of a display function associated with the selectable display element in lieu of initiating execution of the display function associated with the overflow indicator;
    wherein initiating execution of the display function associated with the overflow indicator includes: initiating an expand function to create an enlarged viewing region to enable more of the image to be concurrently displayed on the display screen, resulting in the first portion of the image and the at least part of the second portion of the image being concurrently displayed in the enlarged viewing region;
    wherein initiating execution of a display function associated with the selectable display element includes: initiating an editing function for editing the image in the viewing region;
    displaying the viewing region as a substantially rectangular window in which the image is displayed; and
    wherein initiating the expand function to create an enlarged viewing region includes: enlarging a first rectangular viewing region having a first two-dimensional area into a second rectangular viewing region having a second two-dimensional area, wherein the second two-dimensional area is larger in size then the first two-dimensional area.

* * * * *